(12) United States Patent
Lang (10) Patent No.: US 9,048,701 B2
(45) Date of Patent: Jun. 2, 2015

(54) PASSIVE MAGNETIC BEARINGS FOR ROTATING EQUIPMENT INCLUDING INDUCTION MACHINES

(75) Inventor: Nicholas G. Lang, Cincinnati, OH (US)

(73) Assignee: SIEMENS INDUSTRY, INC., Alpharetta, GA (US)

(*) Notice: Subject to any disclaimer, the term of this patent is extended or adjusted under 35 U.S.C. 154(b) by 891 days.

(21) Appl. No.: 13/221,074

(22) Filed: Aug. 30, 2011

(65) Prior Publication Data

US 2013/0049507 A1 Feb. 28, 2013

(51) Int. Cl.
*H02K 7/09* (2006.01)
*H02K 7/08* (2006.01)
*H02K 5/16* (2006.01)

(52) U.S. Cl.
CPC . *H02K 7/09* (2013.01); *H02K 5/161* (2013.01)

(58) Field of Classification Search
CPC ............. F16C 39/00; H02K 7/09; H02K 5/16
USPC .................................................. 310/90, 90.5
See application file for complete search history.

(56) References Cited

U.S. PATENT DOCUMENTS

| | | | | |
|---|---|---|---|---|
| 5,679,992 A | * | 10/1997 | Miyamoto et al. | 310/90.5 |
| 6,422,990 B1 | * | 7/2002 | Prem | 600/17 |
| 6,877,963 B2 | * | 4/2005 | Beyer et al. | 417/365 |
| 2004/0149357 A1 | * | 8/2004 | Kakimoto et al. | 148/301 |
| 2007/0290569 A1 | * | 12/2007 | Bode et al. | 310/261 |
| 2010/0109463 A1 | * | 5/2010 | Jiang et al. | 310/90.5 |

FOREIGN PATENT DOCUMENTS

| | | |
|---|---|---|
| DE | 19943682 A1 | 3/2001 |
| WO | 9520260 A1 | 7/1995 |

OTHER PUBLICATIONS

PCT International Search Report mailed Oct. 30, 2013 corresponding to PCT International Application No. PCT/US2012/052046 filed Aug. 23, 2012 (14 pages).
Andres Ortiz Salazar, et al. "A Bearingless Method for Induction Machines" In IEEE Service Center, vol. 29, No. 6, Nov. 1, 1993 (pp. 2965-2967).

* cited by examiner

*Primary Examiner* — Terrance Kenerly (57) ABSTRACT

Permanent magnet bearings are incorporated into rotating equipment, such as induction machines, in addition to active magnetic or lubricated primary shaft support bearings. The passive magnetic bearings incorporate permanent magnets that generate directionally oriented magnetic fields of selective intensity. The magnetic field directions are aligned with a desired shaft support bearing preload direction and intensity, for example to exert axial thrust or radial preloads on the support bearings. A plurality of magnetic bearings may be oriented in opposed relationship with neutral or offsetting resultant forces. The passive magnetic force preload may be utilized to offset rotor vertical weight during induction startup or stopping cycles. Passive magnetic force preload may be applied to lubricated bearings to assure their operational stability. The passive magnetic bearings can also absorb radial or axial thrust forces imparted on the rotor shaft during induction machine operation, that may reduce machine operational noise, and energy consumption.

20 Claims, 7 Drawing Sheets

PASSIVE MAGNETIC BEARINGS FOR ROTATING EQUIPMENT INCLUDING INDUCTION MACHINES

BACKGROUND OF THE DISCLOSURE

1. Field of the Invention

The invention relates to induction machine and other rotating equipment bearings and more particularly methods and apparatus for exerting preload bias forces on induction machine lubricated or active magnetic bearings that support rotating shafts, through use of passive, permanent magnet bearings.

2. Description of the Prior Art

Known rotating equipment and induction machines, such as motors, often utilize lubricated mechanical bearings to support a rotating rotor. Exemplary lubricated bearing types include rolling element anti-friction bearings (e.g., ball- or roller-type) wherein the rolling elements are lubricated by a non-pressurized boundary film layer between the element and its associated bearing race, hydrodynamic journal or thrust bearings that generate self supporting pressurized lubricant films and hydrostatic bearings that employ externally pressurized lubricant.

During motor or other rotating machine starting or stopping the rotor shaft may not be supported by a lubricating film within a lubricated bearing, possibly resulting in bearing rotational instability and/or premature bearing/shaft wear. One past solution has been application of auxiliary pressurized "oil jacking" systems to introduce pressurized lubricant to the bearings during induction machine starting or stopping cycles, analogous to a hydrostatic bearing. Such auxiliary systems add installation and maintenance expense to a machine installation, and may not be cost effective for smaller machines. In the past active magnetic bearings that require an electrical power supply to generate a levitation field have been used as replacements for or in conjunction with lubricated bearings in some high power output induction machines.

During normal motor operation, changes in driven shaft load or operating speed or lack of sufficient damping at the rotor shaft and bearing interface may cause lubricating film instability in the lubricated bearings. For example, rolling elements in anti-friction bearings may skid rather than roll relative to the corresponding bearing race, resulting in flat spots on the rolling element or bearing race scoring. In another example, oil slingers used to supply lubricant to bearings may fail to transfer sufficient quantities of lubricant if they lose contact with its corresponding rotor shaft journal. In another example, damping may be reduced below a useable threshold due to insufficient loading and/or high circumferential speed.

In the past active magnetic bearings have been used as the primary support bearings, in parallel with secondary support lubricated bearings in the event of magnetic bearing failure as in the case of a power loss. In these applications the active magnetic support bearings have exerted damping and or stiffening forces on spinning rotors that employ the secondary support lubricated bearings. However, the manufacture and operational costs and complexity of active bearings as compared to those of traditional lubricated bearings are not suitable for all induction machine applications. Additionally, systems which employ magnetic bearings must supply energy to the system to levitate the rotor against gravitational forces.

Thus, a need exists in the art for a method and apparatus that selectively apply desired oriented preload force direction and magnitude on induction machine lubricated bearings, in order to reduce machine wear during starting and stopping cycles.

Another need exists in the art for a method and apparatus that selectively apply desired oriented preload force direction and magnitude on induction machine lubricated bearings, in order to enhance bearing stability during machine operation, including transient machine operation, and in order to reduce bearing noise emission.

Yet another need exists in the art for a method and apparatus that passively and selectively apply desired oriented preload force direction and magnitude on induction machine lubricated bearings, without the need for external power sources and energy consumption associated with active magnetic bearings.

Yet another need exists in the art for a method and apparatus capable of reducing active magnetic bearing noise emission, and/or eliminate or reduce the need of additional lubricated bearings as secondary, back up bearings in the event of an active magnetic bearing failure.

SUMMARY OF THE INVENTION

Accordingly, an object of the invention is to realize a method and apparatus to passively apply preload force on induction machine lubricated bearings in desired direction and magnitude, in order to reduce machine wear during starting and stopping cycles, and in order to enhance lubricated bearing stability during machine operation, including transient machine operation, and to reduce bearing energy consumption or frictional losses as well as noise emission.

These and other objects are achieved in accordance with the present invention by incorporation of permanent magnet bearings in rotating machines, including induction machines, in addition to lubricated or active magnetic shaft support bearings. The permanent magnet bearings incorporate permanent magnets that generate directionally oriented magnetic fields of selective intensity. The magnetic field directions are aligned with a desired support bearing (whether lubricated or active magnetic bearing) preload direction and intensity, for example to exert axial thrust or radial preloads on the support bearings. By application of a plurality of magnetic bearings their respective magnetic forces may be oriented in opposed relationship with canceled or offsetting resultant forces. The passive magnetic preload may be utilized to offset rotor vertical weight during induction startup or stopping cycles. Passive preload may be applied to rolling element bearings to assure proper element contact with its corresponding bearing race, or to assure that oil slingers maintain sufficient lubricant film stability for transport of lubricant to bearings (as opposed to undesired oil whip or oil whirl instabilities that can potentially lead to bearing failure. The passive magnetic bearings can also absorb radial or axial thrust forces imparted on the rotor shaft during induction machine operation, that can help reduce noise emissions generated at the support bearing/shaft interface.

The present invention features an induction machine apparatus, including a machine housing and a bearing housing coupled to the machine housing. A stator is in the machine housing and a rotor is in turn oriented within the stator. The rotor has a rotor shaft rotatively captured in the bearing housing. A support bearing that is a lubricated bearing or an active magnetic bearing is in the bearing housing and rotatively captures the rotor shaft. A permanent magnet bearing is coupled to the machine housing, and exerts a directional magnetic force on the rotor shaft that generates a desired intensity and magnitude preload force on the support bearing.

The magnetic force preload on the rotor and support bearing may be oriented axially, radially, sideways, up or down in any desired direction or intensity. Solid or laminated electrical steel may be positioned proximal the permanent magnet in order to orient and/or vary intensity of the generated magnetic force.

The present invention also features an induction machine or other rotating machine apparatus, including a machine housing and a bearing housing coupled to the machine housing. A stator is in the machine housing, along with a rotor oriented within the stator. The rotor has a rotor shaft that is rotatively captured in the bearing housing by a support bearing that is a lubricated or active magnetic bearing. A permanent magnet bearing is located in the bearing housing in tandem with the support bearing. The magnetic bearing has a permanent magnet oriented in opposed spaced relationship with the rotor shaft and exerts a directional magnetic force thereon. Electrical steel laminations are oriented proximal the permanent magnet for orienting the magnetic force exerted on the shaft. The permanent magnet bearing directional magnetic force generates a desired intensity and magnitude preload force on the support bearing.

The present invention also features a method for preloading bias force on a support bearing (whether an active magnetic or a lubricated bearing) in an induction or other rotating machine that has a machine housing; a bearing housing coupled to the machine housing; a stator in the machine housing; a rotor oriented within the stator, having a rotor shaft rotatively captured in the bearing housing by a support bearing that is an active magnetic or a lubricated bearing. In this method the preload bias force is performed by providing a permanent magnet bearing that generates a directional magnetic force; coupling the permanent magnet bearing to the induction machine proximal the rotor; and orienting the permanent magnet bearing so that its directional magnetic force is exerted on the rotor shaft and generates a desired preload force intensity and direction on the shaft support bearing. A plurality of permanent magnet bearings may be coupled to the induction machine and oriented to generate opposed preload forces on the active magnetic or lubricated support bearing, with neutral or offsetting combined resultant preload force.

The objects and features of the present invention may be applied jointly or severally in any combination or sub-combination by those skilled in the art.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

After considering the following description, those skilled in the art will clearly realize that the teachings of the present invention can be readily utilized in induction machines, such as motors, in order to apply biasing preloads of any desired magnitude and direction to their active magnetic or lubricated shaft support bearings without external energy sources. For example, the passive magnetic bearings of the present invention do not need external electrical power sources to generate magnetic fields as is required for known active magnetic bearings. Similarly, auxiliary pressurized lubrication systems are not needed to create lubricated bearing preload biasing forces, as is required in known "oil jacking" solutions for hydrodynamic and rolling element bearings or known hydrostatic bearings. The permanent magnetic bearings may be substituted for or supplement secondary support lubricated bearings that are used in tandem with primary active magnetic support bearings in case of failure of or loss of electrical power to the active magnetic primary support bearing.

Figure 1:
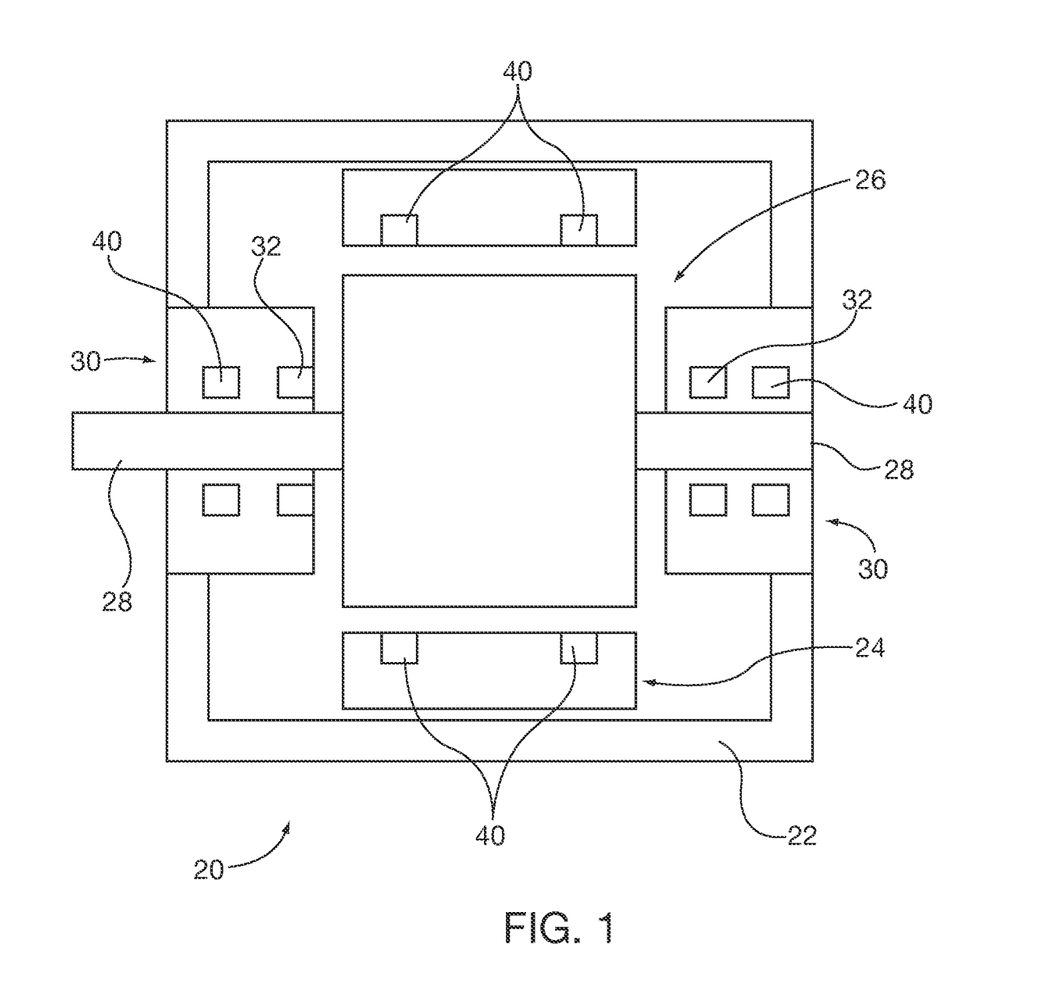
FIG. 1 is a schematic cross-sectional elevation of an induction machine with a horizontally oriented rotor rotational axis, incorporating embodiments of the passive magnetic bearings of the present invention.

FIG. 1 schematically depicts an induction machine motor 20, having a motor housing 22, a stator 24 and a horizontally oriented rotor 26. The rotor 26 is rotatively mounted in the motor housing by rotor shaft 28, captured within a pair of bearing housings 30. Each bearing housing 30 has a shaft support bearing assembly 32, which may incorporate a known active magnetic bearing and/or a known lubricated bearing. Henceforth in this description reference will be made to lubricated support bearings, but it should be understood that active magnetic bearings may be substituted for them. The lubricated bearing may be a known radial journal bearing, an axial thrust bearing or both. The lubricated bearing 32 may be any known lubricated bearing, including by way of example rolling element anti-friction bearings, hydrodynamic bearings or hydrostatic bearings. A plurality of radially oriented permanent magnet bearings 40 are incorporated as part of the motor 20. As shown, the permanent magnet bearings 40 are located within the bearing housings 30 in tandem with the lubricated bearings 32, and exert magnetic force directly on the rotor shaft 28. Permanent magnet bearings 40 are also incorporated within the stator 24 and exert magnetic force on the rotor 26 laminations. The rotor 26 laminations are affixed to and transfer magnetic force to the rotor shaft 28. In either magnetic bearing 40 location, resultant magnetic forces generated by the permanent magnet bearings are imparted on the rotor shaft and in turn into the lubricated bearings 32, whether those magnetic bearings are incorporated in the bearing housing 30 or stator 24 or both.

Figure 2:
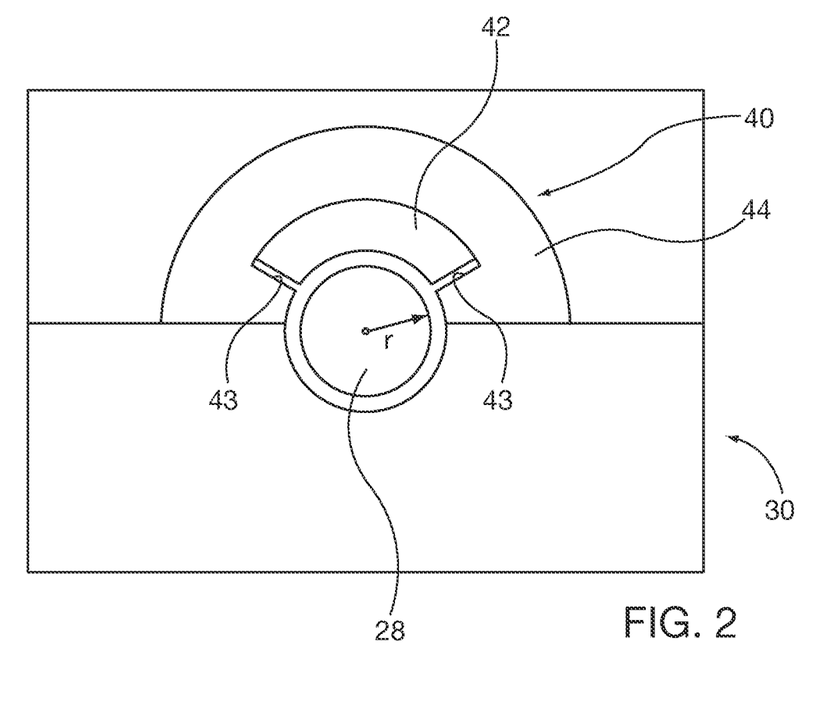
FIG. 2 is an elevational view of a journal bearing embodiment of a passive magnetic bearing of the present invention within a bearing housing.
Figure 3:
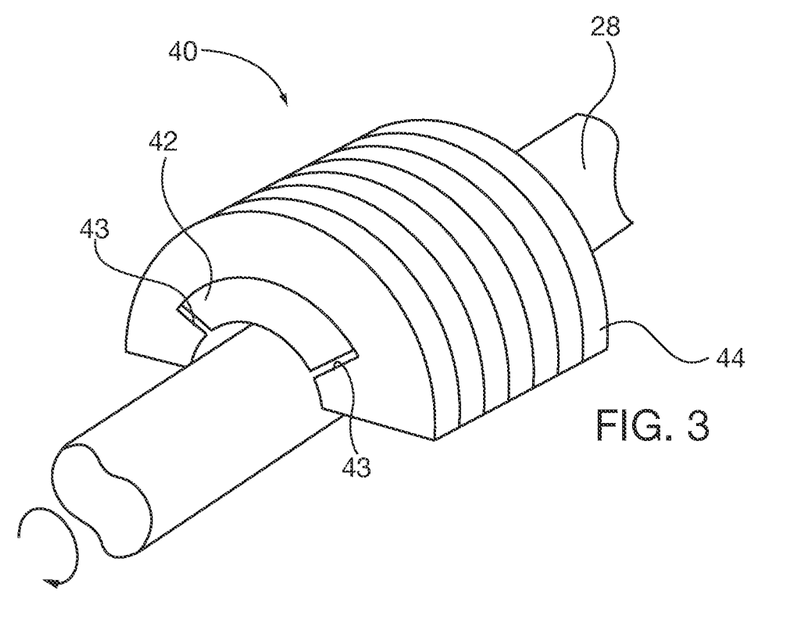
FIG. 3 is a perspective view of the bearing embodiment of FIG. 2 without a bearing housing.

FIGS. 2 and 3 show an exemplary permanent magnetic bearing 40 mounted in a bearing block housing 30 that circumscribes the rotor shaft 28. The bearing 40 includes a sector-shaped permanent magnet 42 that has a radial circumference of less than 180°, and preferably between approximately 40° and 60°. The magnet 42 is mounted within the stationary bearing block 30 a spaced distance from the spinning rotor shaft 28. The permanent magnet 42 may be composed of known permanent magnet materials, including but not limited to neodynium iron boron, Samarium cobalt, Alnico, ferrite, ceramics, as well as other metal alloys or composite materials. Permanent magnet material 42 must be selected for the appropriate operating temperature and may be selected from any of the known grades of magnets. The permanent magnet 42 may be more compact where using stronger magnets, which would be indicated by a high maximum B-H product. A sector-shaped stationary ferromagnetic core of electrical steel 44 envelops the outer diameter of the permanent magnet 42, also within the bearing block 30 a spaced distance from the spinning rotor shaft 28 and with a radially-spaced gap 43 flanking both sides of the permanent magnet 42, in order to assist with directional orientation of the magnetic field flux lines generated by the permanent magnet. The ferromagnetic core 44 is preferably constructed of a lamination stack oriented parallel to the axial ends of the permanent magnet 42. The ferromagnetic core 44 axial and radial dimensions may be altered at the discretion of one skilled in the art. For example, while the core 44 is shown as semi-circular, it can be constructed as a full annular shaped core of 360°. Similarly, the axial length of the core 44 can be less than or greater than the length of the permanent magnet 2.

Figure 4:
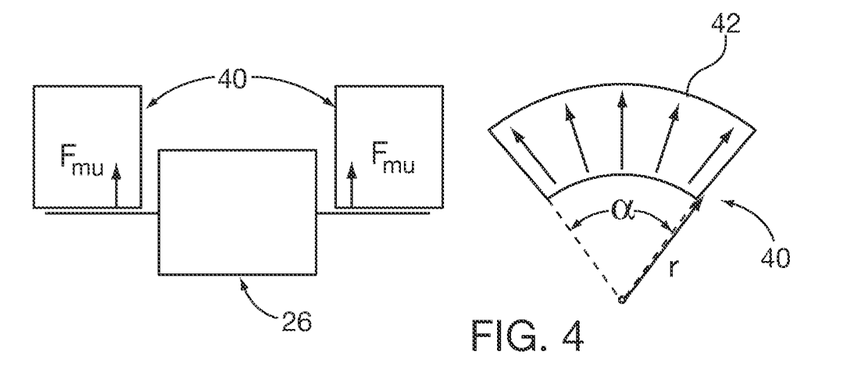
FIG. 4 is a schematic elevational view of an embodiment of the bearing of FIG. 2, applying an upwardly biasing preload on a horizontal rotational axis rotor.
Figure 5:
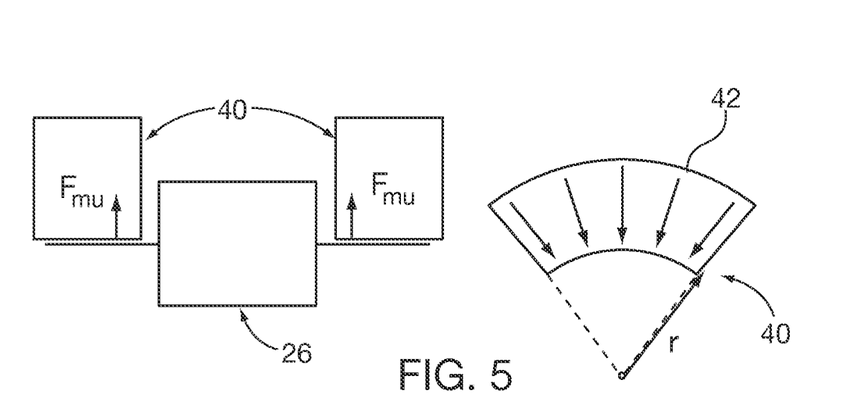
FIG. 5 is a schematic elevational view of an embodiment of the bearing of FIG. 2 applying a upwardly biasing preload on a horizontal rotational axis rotor.
Figure 6:
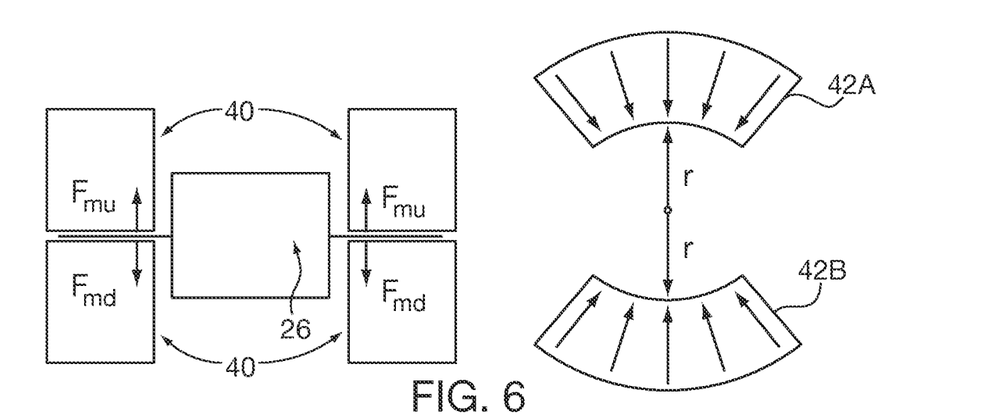
FIG. 6 is a schematic elevational view of an embodiment of the bearing of FIG. 2, with a pair of opposed bearings applying opposing upwardly and downwardly oriented offsetting resultant biasing preload on a horizontal rotational axis rotor.

FIGS. 4-6 show application of the permanent magnet bearing 40 to provide different preload orientations on rotor shaft 28 that in turn will cause the same preload orientations on the lubricated bearings (or alternatively active magnetic bearings) that are supporting the shaft. For simplicity of these figures, the lubricated bearings and other structural components of the induction machine are not shown. In FIG. 4, the magnetic field flux lines (and hence the magnetic force orientation) of the sector shaped permanent magnet 40 are radially outwardly directed by circumferential angle α, in an upwardly direction relative to the rotational axis of rotor shaft 28 (denoted by radius r). Due to the orientation of the flux lines, the flux density is greatest in the upper region. Hence as shown in FIG. 4 the preload force (denoted by the arrows $F_{mu}$) is upwardly directed. In contrast the magnetic field flux of the permanent magnet 40 of FIG. 5 is downwardly directed, (i.e., attracting the rotor shaft) the pre-load forces however remain unchanged (denoted by the arrows $F_{mu}$). In FIG. 6 a pair of opposed permanent magnets 42A, 42B generate opposing preload forces denoted by $F_{mu}$ and $F_{md}$. The resultant force ($F_{mu}+F_{md}$) can be tuned by selection of respective field intensities and directional orientation, though generally in a horizontally oriented rotor shaft induction machine the upward preload is greater than or equal to the downward preload. Additionally, since the forces generated are inversely related to their proximity between the rotor and stator, each magnet contributes a negative stiffness at this region to the rotordynamic operation of the system. The direction and magnitude of this negative stiffness can be tuned to counterbalance that of the primary bearing system, approaching a free-free condition. This effect can be positively applied to a system to attain higher rotor lateral critical speed. While two opposed magnetic bearings with permanent magnets 42A and 42B are shown in FIG. 6, a plurality of two or more such bearings can be combined at the discretion of one skilled in the art, depending on the desired preload force to be generated and the physical dimensional constraints of the induction machine.

Figure 7:
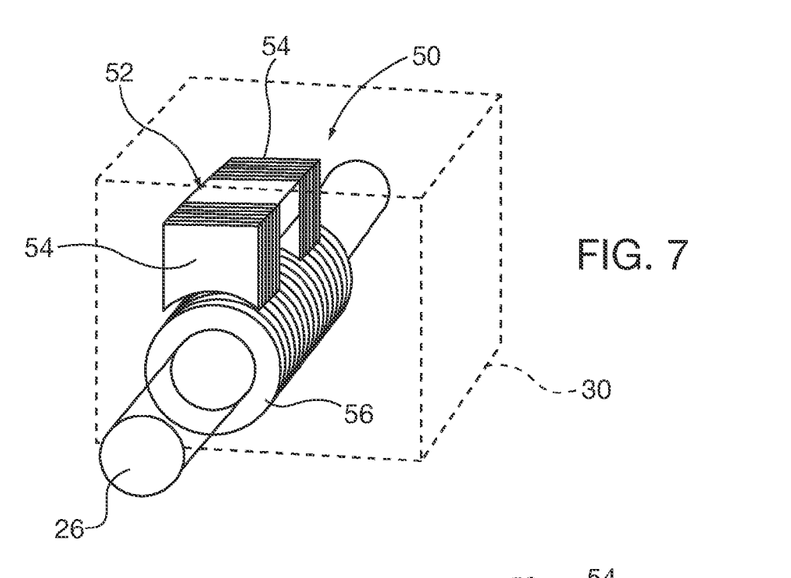
FIG. 7 is a perspective view of an axial flux, radial force bearing embodiment of a passive magnetic bearing of the present invention, within a bearing housing that is shown in phantom.
Figure 8:
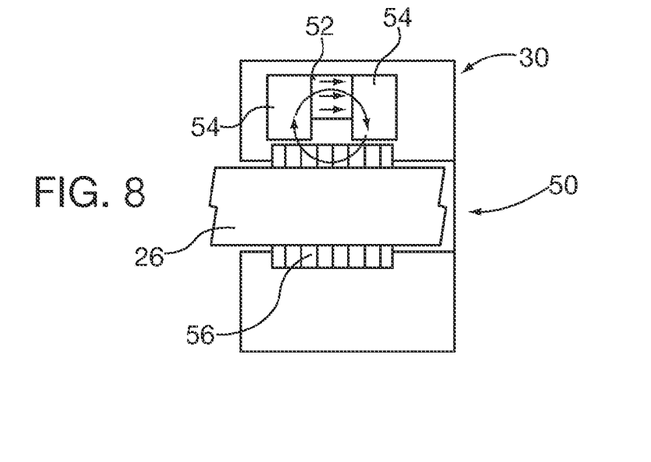
FIG. 8 is a side elevational view of the bearing embodiment of FIG. 7.

FIGS. 7 and 8 show a permanent magnet bearing 50 embodiment that generates axially oriented magnetic flux and attractive (upwardly directed) preload forces on a rotor shaft 26. For simplicity of FIG. 7 the bearing mounting block 30 is shown in phantom lines. The permanent magnet bearing 50 has a stationary permanent magnet 52 that has a generally rectangular block shape, and generates magnetic force in an axial direction relative to the shaft 26. However, the permanent magnet 52 may also be constructed of any other desired shape, including the sector shape of that shown in FIG. 2. The magnet 52 is spaced a distance away from the spinning rotor shaft 28. A pair of electrical steel cores 54 flank the axial ends of the permanent magnet 52 and are affixed in a stationary position within the bearing block, spaced from the spinning rotor shaft 28. The cores 54 shape the magnetic field generated by the permanent magnet 52, and are preferably constructed of a lamination stack oriented parallel to the axial ends of the permanent magnet. Additional magnetic field shaping may be accomplished by placement of an electrical steel core 56 in a fixed position directly on the rotor shaft 28, and thereby rotating with the shaft. If the axial preload permanent magnetic bearing is located in the induction machine stator 24, the rotor 26 laminations may serve as the rotating steel core 56.

Figure 9:
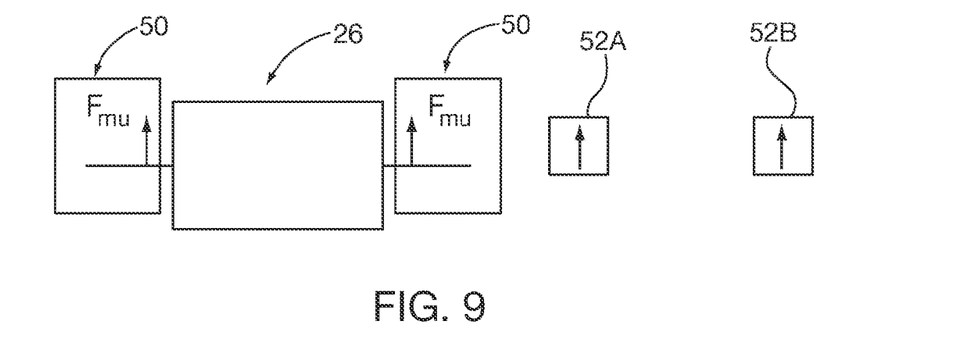
FIG. 9 is a schematic elevational view of an embodiment of the bearing of FIG. 7, with a pair of opposed bearings applying upward radially oriented offsetting resultant biasing preload on a horizontal rotational axis rotor.

In FIG. 9 a pair of permanent magnet axially oriented magnetic field preload bearings 50 are incorporated in an induction machine to impart tandem upwardly directed preloads $F_{mu}$ on the rotor 26 through use of a pair of opposed permanent magnets 52A and 52B. As in the case of radially oriented preload permanent magnetic bearings 40 of FIG. 2, the number and location of bearings and resultant preload force (here in FIG. 9 the resultant of $F_{mu}$ on each side of the shaft) may be selected by one skilled in the art.

Figure 10:
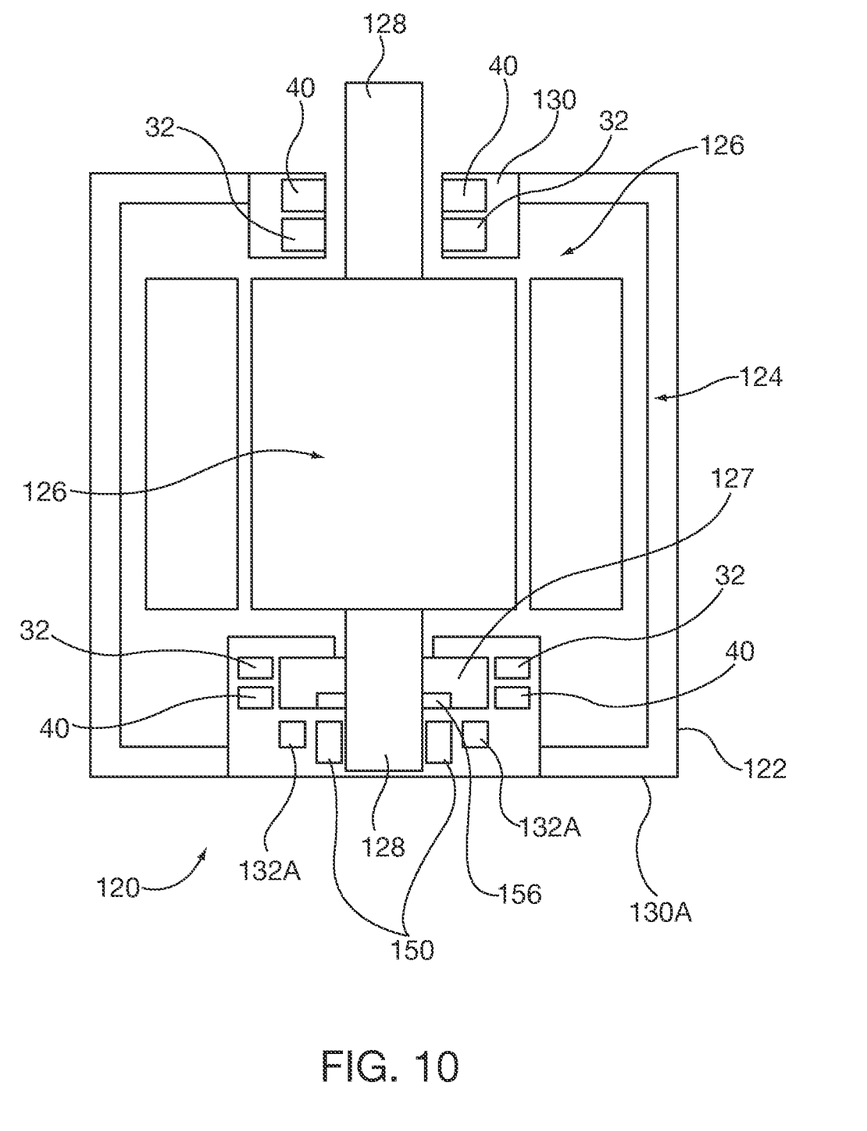
FIG. 10 is a schematic cross-sectional elevation of an induction machine with a vertically oriented rotor rotational axis, incorporating embodiments of the passive magnetic bearings of the present invention.

In FIG. 10 the vertical shaft induction machine 120 has a machine housing 122 including stator 124 and vertically oriented rotor 126 having a rotor shaft 128 that is rotatively captured in bearing housings 130 and 130A. Each of the bearing housings 130, 130A have lubricated journal bearings 32, as well as radially oriented permanent magnet bearings 40, such as those shown in FIG. 2. The bearing housing 130A also includes axial thrust bearings to support the weight of the spinning rotor 126 that are shown as lubricated thrust bearing 132A of known construction, and permanent magnet thrust bearing 150. As shown in FIG. 10 the rotor shaft 126 includes a thrust flange 127 that abuts against and provides a journal surface for the lubricated thrust bearings 132 and the lubricated journal bearings 32. The rotor thrust flange 127 as shown also includes an optional electrical steel flange-like insert 156.

Figure 11:
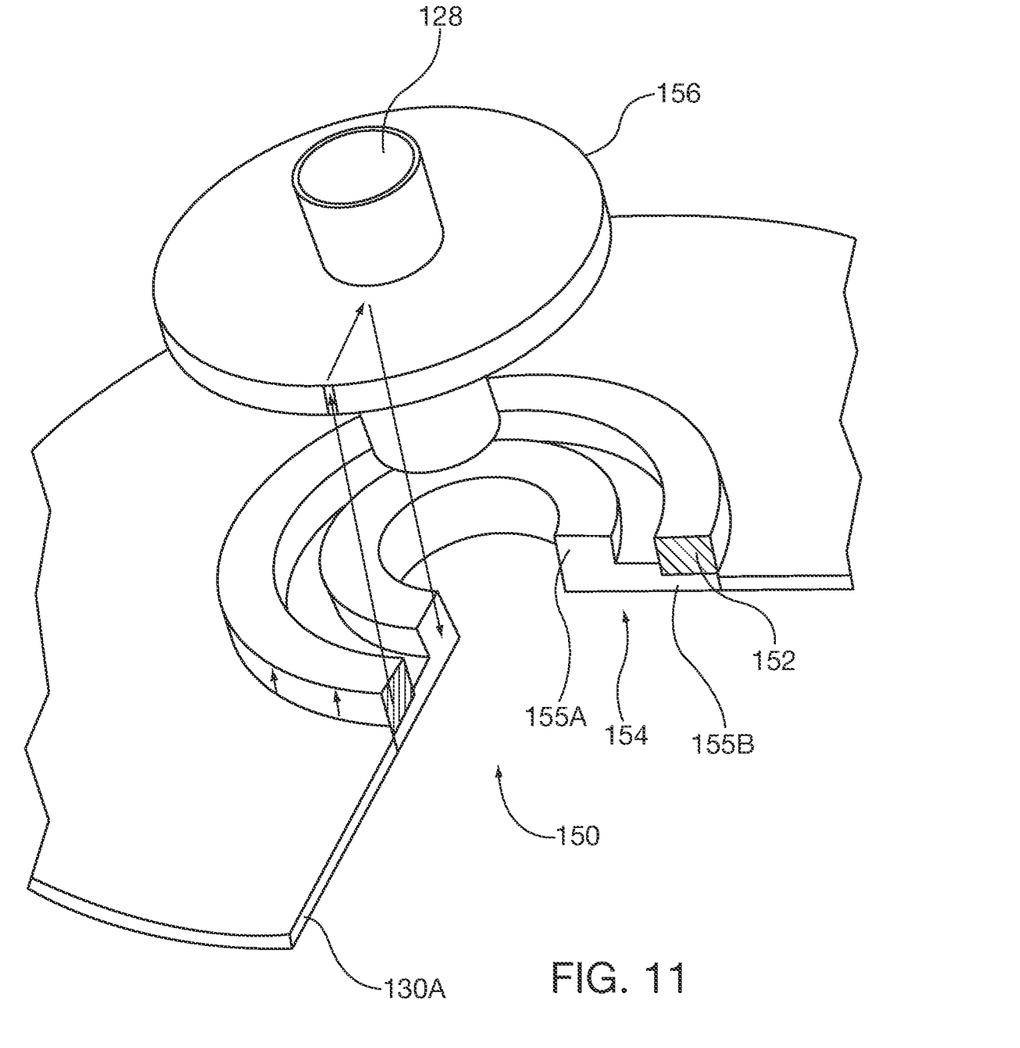
FIG. 11 is a perspective view of an alternative embodiment of an axial thrust bearing embodiment of a passive magnetic bearing of the present invention as incorporated into the vertically oriented rotor shaft induction machine of FIG. 10.

The permanent magnet axial thrust bearing embodiment 150 is shown in FIG. 11, and includes a mounting bracket formed in the bearing housing 130A. An annular shaped permanent magnet 152 circumscribes the rotor shaft 128 and generates an upwardly directed magnetic field that is shaped by electrical steel core 152 and the electrical steel core 156 that is affixed to the rotating shaft 128. The electrical steel core 156 is formed with a hub portion 155A that is concentric with and spaced away from the inner diameter of the permanent magnet 152 and a flange portion 155B radially projecting from the hub portion and in abutting contact with an axial face of the permanent magnet.

The permanent magnet axial thrust bearing 150 can be used in applications other than to support weight of a vertically oriented rotor shaft. For example, they may be applied to horizontally oriented shaft rotors directly on the shaft as a substitute for the embodiment 50 shown in FIGS. 7 and 8. Alternatively they may be applied to the rotor laminations as is shown in the induction machine embodiment of FIG. 1 by orienting the mounting bracket proximal and parallel to one or both ends of the rotor 26 lamination stack. In such an application the rotor laminations substitute for the electrical steel core 156.

Figure 12:
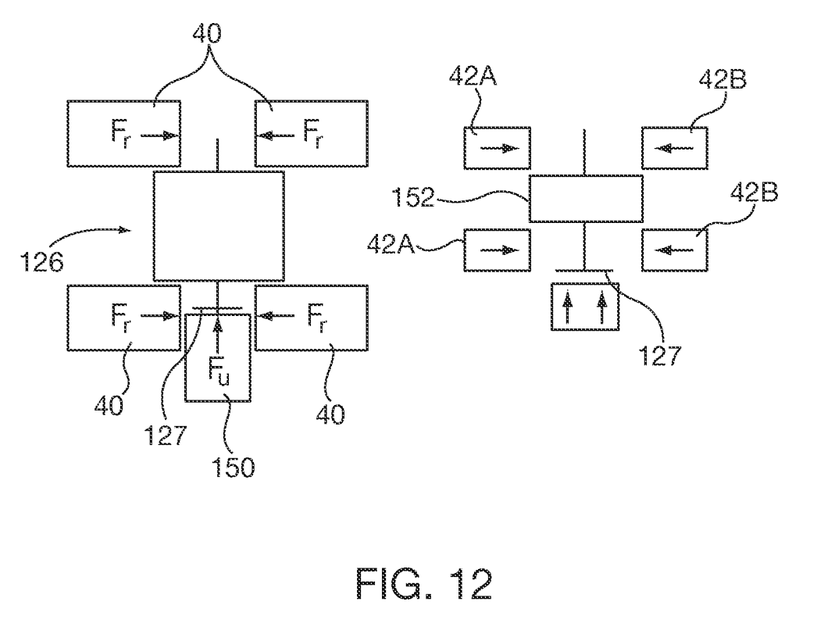
FIG. 12 is a schematic elevational view of an embodiment of the passive magnetic bearings of the present invention as incorporated into the vertically oriented rotor shaft induction machine of FIG. 10, with pairs of opposed bearings of FIG. 2 applying opposing radially oriented (horizontal) offsetting resultant biasing preload and a bearing of FIG. 11 applying an upwardly directed biasing preload on a vertical rotational axis rotor.

FIG. 12 schematically depicts the magnetic fields and resultant magnetic forces $F_r$, $F_u$ that are imparted on the vertically oriented rotor 126. As with other embodiments described herein, the resultant preload forces magnitudes and directions imparted on the vertical rotor shaft 128 can be selectively chosen for any given application.

Although various embodiments which incorporate the teachings of the present invention have been shown and described in detail herein, those skilled in the art can readily devise many other varied embodiments that still incorporate these teachings.

What is claimed is:

1. An induction machine apparatus, comprising:
a machine housing;
a bearing housing coupled to the machine housing;
a stator in the machine housing;
a rotor oriented within the stator, having a rotor shaft rotatively captured in the bearing housing;
a rotor shaft support bearing, selected from the group consisting of a lubricated bearing and an active magnetic bearing, in the bearing housing, rotatively capturing the rotor shaft; and
a permanent magnet bearing in the machine housing, the permanent magnet bearing exerting a directional magnetic force on the rotor shaft that generates a desired intensity and magnitude preload force on the support bearing,
wherein the directional magnetic force preloads the support bearing radially,
wherein the permanent magnet is sector-shaped, having an inner concave surface in opposed spaced relationship with the rotor shaft, an outer convex surface, and axial width, and the directional magnetic force generated thereby is aligned radially with the rotor shaft centerline, and
further comprising electrical steel circumscribing the permanent magnet outer convex surface and at least part of the axial width thereof, for orienting the magnetic force exerted on the shaft.

2. The apparatus of claim 1, wherein the permanent magnet sector shape subtends a circumference of less than 180 degrees.

3. The apparatus of claim 2, wherein the permanent magnet sector shape subtends a circumference of between approximately 40 degrees and 50 degrees.

4. The apparatus of claim 1, wherein the electrical steel comprises a plurality of laminations oriented axially with respect to the permanent magnet.

5. The apparatus of claim 1 further comprising electrical steel affixed to the rotor shaft in opposed spaced relationship with the permanent magnet inner concave surface and at least part of the axial width thereof, for orienting the magnetic force exerted on the shaft.

6. The apparatus of claim 1, wherein the permanent magnet bearing is mounted in the bearing housing in tandem with the support bearing.

7. The apparatus of claim 1, wherein:
the rotor is laminated; and
the permanent magnet bearing is mounted in the stator and exerts magnetic force on the rotor laminations and in turn on the rotor shaft.

8. In an induction machine of the type having:
a machine housing;
a bearing housing coupled to the machine housing;
a stator in the machine housing;
a rotor oriented within the stator, having a rotor shaft rotatively captured in the bearing housing;
a rotor shaft support bearing, selected from the group consisting of a lubricated bearing and an active magnetic bearing, in the bearing housing, rotatively capturing the rotor shaft; and
a method for preloading bias force on the support bearing, comprising:
providing a permanent magnet bearing that generates a directional magnetic force;
coupling the permanent magnet bearing to the induction machine proximal the rotor; and
orienting the permanent magnet bearing so that its directional magnetic force is exerted on the rotor shaft and generates a desired preload force intensity and direction on the support bearing,
wherein the directional magnetic force preloads the support bearing radially,
wherein the permanent magnet is sector-shaped, having an inner concave surface in opposed spaced relationship with the rotor shaft, an outer convex surface, and axial width, and the directional magnetic force generated thereby is aligned radially with the rotor shaft centerline, and
wherein electrical steel circumscribes the permanent magnet outer convex surface and at least part of the axial width thereof, for orienting the directional magnetic force exerted on the shaft.

9. The method of claim 8, wherein a plurality of permanent magnet bearings are coupled to the induction machine and are oriented to generate offsetting opposed preload forces on the support bearing.

10. The method as claimed in claim 8, wherein the permanent magnet sector shape subtends a circumference of less than 180 degrees.

11. The method as claimed in claim 10, wherein the permanent magnet sector shape subtends a circumference of between approximately 40 degrees and 50 degrees.

12. The method as claimed in claim 8, wherein the electrical steel comprises a plurality of laminations oriented axially with respect to the permanent magnet.

13. The method as claimed in claim 8 further comprising electrical steel affixed to the rotor shaft in opposed spaced relationship with the permanent magnet inner concave surface and at least part of the axial width thereof, for orienting the directional magnetic force exerted on the shaft.

14. An induction machine apparatus, comprising:
a machine housing;
a bearing housing coupled to the machine housing;
a stator in the machine housing;

a rotor oriented within the stator, having a rotor shaft rotatively captured in the bearing housing;

a rotor shaft support bearing, selected from the group consisting of a lubricated bearing and an active magnetic bearing, in the bearing housing, rotatively capturing the rotor shaft; and a permanent magnet bearing in the machine housing, the permanent magnet bearing exerting a directional magnetic force on the rotor shaft that generates a desired intensity and magnitude preload force on the support bearing, wherein the directional magnetic force preloads the support bearing radially, wherein the permanent magnet is sector-shaped, having an inner concave surface in opposed spaced relationship with the rotor shaft, an outer convex surface, and axial width; and the magnetic force generated thereby is aligned radially with the rotor shaft centerline, and wherein the permanent magnet sector shape subtends a circumference of less than 180 degrees.

15. The apparatus as claimed in claim 14, wherein the permanent magnet sector shape subtends a circumference of between approximately 40 degrees and 50 degrees.

16. The apparatus as claimed in claim 14, further comprising electrical steel circumscribing the permanent magnet outer convex surface and at least part of the axial width thereof, for orienting the magnetic force exerted on the shaft.

17. The apparatus as claimed in claim 16, wherein the electrical steel comprises a plurality of laminations oriented axially with respect to the permanent magnet.

18. The apparatus as claimed in claim 14 further comprising electrical steel affixed to the rotor shaft in opposed spaced relationship with the permanent magnet inner concave surface and at least part of the axial width thereof, for orienting the magnetic force exerted on the shaft.

19. The apparatus as claimed in claim 14, wherein the permanent magnet bearing is mounted in the bearing housing in tandem with the support bearing.

20. The apparatus as claimed in claim 14, wherein:

the rotor is laminated; and the permanent magnet bearing is mounted in the stator and exerts magnetic force on the rotor laminations and in turn on the rotor shaft.

* * * * *